United States Patent
Cui et al.

(10) Patent No.: US 8,784,650 B2
(45) Date of Patent: Jul. 22, 2014

(54) METHOD AND EQUIPMENT FOR MULTISTAGE LIQUEFYING OF CARBONACEOUS SOLID FUEL

(75) Inventors: Minli Cui, Taiyuan (CN); Jianwei Huang, Taiyuan (CN); Xu Hao, Taiyuan (CN); Liren Cao, Taiyuan (CN); Yongwang Li, Taiyuan (CN)

(73) Assignee: Synfuels China Technology Co., Ltd, Huairou District, Beijing (CN)

( * ) Notice: Subject to any disclaimer, the term of this patent is extended or adjusted under 35 U.S.C. 154(b) by 433 days.

(21) Appl. No.: 13/120,366

(22) PCT Filed: Jul. 1, 2009

(86) PCT No.: PCT/CN2009/072584
§ 371 (c)(1),
(2), (4) Date: Mar. 22, 2011

(87) PCT Pub. No.: WO2010/040291
PCT Pub. Date: Apr. 15, 2010

(65) Prior Publication Data
US 2011/0174683 A1 Jul. 21, 2011

(30) Foreign Application Priority Data

Oct. 9, 2008 (CN) .......................... 2008 1 0148890

(51) Int. Cl.
| | | |
|---|---|---|
| *C10G 1/00* | (2006.01) | |
| *C10G 2/00* | (2006.01) | |
| *C10L 1/32* | (2006.01) | |
| *C10G 65/00* | (2006.01) | |
| *C10G 1/06* | (2006.01) | |
| *C10G 65/12* | (2006.01) | |
| *C10J 3/46* | (2006.01) | |

(52) U.S. Cl.
CPC ............ *C10G 1/002* (2013.01); *C10G 2400/04* (2013.01); *C10G 2300/307* (2013.01); *C10G 2300/308* (2013.01); *C10G 2300/1011* (2013.01); *C10G 2/32* (2013.01); *C10J 2300/0989* (2013.01); *C10J 2300/0973* (2013.01); *C10J 2300/1678* (2013.01); *C10G 2300/304* (2013.01); *C10G 2300/202* (2013.01); *Y02T 50/678* (2013.01); *C10J 2300/093* (2013.01); *C10G 2300/1022* (2013.01); *C10J 2300/0903* (2013.01); *C10L 1/322* (2013.01); *C10G 2300/701* (2013.01); *C10J 2300/0959* (2013.01); *Y02E 50/32* (2013.01); *C10G 65/00* (2013.01); *C10J 2300/1659* (2013.01); *C10G 2/30* (2013.01); *C10G 2400/08* (2013.01); *C10J 2300/0906* (2013.01); *C10G 1/065* (2013.01); *C10G 2400/02* (2013.01); *C10G 2300/305* (2013.01); *C10G 2400/28* (2013.01); *C10G 65/12* (2013.01); *C10J 3/466* (2013.01)
USPC ........................................................ 208/415

(58) Field of Classification Search
USPC ........................................... 208/415–418, 89
See application file for complete search history.

(56) References Cited

U.S. PATENT DOCUMENTS

| | | | | | |
|---|---|---|---|---|---|
| 3,475,287 | A | * | 10/1969 | De Graff ....................... | 202/155 |
| 3,607,719 | A | * | 9/1971 | Johnson et al. ............... | 208/409 |
| 4,111,786 | A | * | 9/1978 | Sugimura et al. ............. | 208/415 |
| 4,152,244 | A | | 5/1979 | Raichle et al. | |
| 4,185,395 | A | * | 1/1980 | Nakako et al. .................. | 34/389 |
| 4,260,472 | A | * | 4/1981 | Eisenlohr et al. ............. | 208/403 |

FOREIGN PATENT DOCUMENTS

| | | | |
|---|---|---|---|
| CN | 1814703 | * | 8/2006 |
| CN | 101270294 | | 9/2008 |
| EP | 0400740 | * | 12/1990 |
| JP | 53-145811 | | 12/1978 |

OTHER PUBLICATIONS

Chris Higman, Maarten van der Burgt, Chapter 2—The Thermodynamics of Gasification, Gasification, Gulf Professional Publishing, Burlington, 2003, pp. 9-28, ISBN 9780750677073, http://dx.doi.org/10.1016/B978-075067707-3/50002-4. (http://www.sciencedirect.com/science/article/pii/B9780750677073500024), p. 11.* http://www.engineeringtoolbox.com/coal-heating-values-d_1675.html.*

\* cited by examiner

*Primary Examiner* — Randy Boyer
*Assistant Examiner* — Juan Valencia
(74) *Attorney, Agent, or Firm* — McDonnell Boehnen Hulbert & Berghoff LLP

(57) ABSTRACT

A method for multistage transforming carbonaceous solid fuel to oil, includes mixing solid fuel (17) with heavy oil (40) to obtain fuel-oil slurry; heating and dehydrating of the slurry; liquefying of the slurry by hydrogenation under a low-medium pressure to obtain light oil (25) and heavy oil-residue slurry; hydrorefining the light oil (25) to obtain refined oil; gasifying the heavy oil-residue slurry in a gasifier (11) to obtain syngas (47); producing F-T synthesis oil (52) with the syngas (47); hydrorefining and hydrocracking the F-T synthesis oil (52) to obtain refined oil; mixing the refined oil from the F-T synthesis oil with the refined oil from liquefying by hydrogenation for producing high quality oil with low sulfur and low ammonia, and other chemical product. The method can be applied to various kinds of coals and biomass, especially applied to lignite and biomass. A suspended bed reactor for liquefying of carbonaceous solid fuel by hydrogenation is also disclosed.

12 Claims, 2 Drawing Sheets

METHOD AND EQUIPMENT FOR MULTISTAGE LIQUEFYING OF CARBONACEOUS SOLID FUEL

CROSS-REFERENCE TO RELATED APPLICATIONS

The present application is a U.S. national stage application of PCT/CN2009/072584, filed Jul. 1, 2009, which claims priority to a corresponding patent application filed in China and having application number CN 200810148890.5, filed on Oct. 9, 2008, the entire contents of which are herein incorporated by reference.

FIELD OF THE INVENTION

This invention relates to a method for multistage transforming carbonaceous solid fuel into oil and the equipment thereof. This method, which can efficiently convert carbonaceous solid fuel into high quality oil by multistage liquefying, is an advanced energy conversion technique.

BACKGROUND OF THE INVENTION

Along with the growth of people's demands for liquid fuel based on petroleum and the abatement of exploitable oil reserves, producing usable liquid fuel from solid fuel, such as coal, attracts more and more attention.

At present, coal is mainly used for power generation, coking and other industries or civil fuel. In some filed such as fuel field and power field, low-sulfur high quality or specific coals are needed. However, a great part of coal reserves cannot meet these requirements. China is abundant in coal resources, but only half of them are of high quality, and the rest are lignite or other kinds of coals. Low-rank coal including lignite represents about up to 40% of the total Chinese coal reserves, especially in east Inner-Mongolia, this value reaches up to 70% or more. Reasonable exploitation and utilization of lignite becomes a big issue, so the exploitation of lignite remains very limited until now. For instance, in China, total coal production arrives at 2151.31 million tons in 2005, wherein high quality coal constitutes 65%, but lignite, which has a comparatively higher reserve, achieves a production of 97.64 million tons and represents only 4.5% of the total coal production.

The utilization of low-rank coal such as lignite raises the following problems: (1) when high quality coal is exploited, the intergrowth and associated low quality coal would not be mined due to its low market value, resulting in a considerable waste of coal resources. (2) because of its high moisture, high ash, high volatile matter content and low heating value, lignite is usually regarded as a low quality steam coal; in addition, due to its fragileness and susceptibility to differentiation and spontaneous combustion, it is very difficult for long-haul transportation, making lignite only suited for local utilization. Hence, some alternative ways to make use of low-rank coals should be developed so as to regulate the structure of coal exploitation and consumption, thus achieve unification of the structure of coal resource, production and consumption and also reduce the overall consumption intensity of the coal resource.

Among many ways of using above-mentioned coals, substantially high quality coal has become feedstock for fuel and power industries with low utilization efficiency and heavy pollution. China's immense coal-based power industry has been operated under efficiency around 30 to 35% for a long time, which causes serious pollution problem and significant waste of resource. Along with power industry turning to nuclear power, wind and solar energy, greater efficiency for coal use becomes very important to the sustainable development in the future for China, even for the world. Therefore, CTL (Coal to Liquid) will be one of the most significant technologies for manufacturing oil products, which are in shortage but crucial for the human society's development. Besides, biomass can also be treated through the same process to yield oil as coal liquefaction; it can be a potential and effective solution to human's sustainable development in long term after coal is exhausted.

Generally speaking, there are three different processes to produce oil by coal liquefaction: partial liquefaction, which partially transforms coal to tar by carbonization; direct liquefaction, that completely converts coal into oil directly by hydrogenation; indirect liquefaction, that firstly turns coal into syngas ($CO+H_2$), then produces high quality oil from syngas via Fischer-Tropsch (F-T) reaction. These three methods have been industrialized from last century and became German's main oil producing source during the $2^{nd}$ World War. Early period of coal liquefaction research for large-scale industrialization had lasted till 1960's, thereafter the discovery and intensive exploitation of petroleum halted it. However, scientific research in laboratory continued and a particular coal conversion domain appeared. In 1950's, based on coal gasification and Fischer-Tropsch technology, South Africa realized an industrial scale CTL plant with indirect liquefaction process, SASOL's CTL plant.

The world petroleum crisis in 1970's started a new era for coal liquefaction research. Thanks to the technique improvement in petroleum processing, the research work obtained good progress at higher levels from 1970 to 1990, for instance, modern pressurized coal gasification technology "entrained flow bed coal gasification" came out, became the foundation of large-scale coal gasification technology and accelerated the syngas chemistry's industrialization. Industrial development of large-scale manufacturing of ammonia and methanol from coal was just based on efficient and massive coal gasification. Meanwhile, new techniques for direct coal liquefaction by hydrogenation working under milder conditions appeared, like direct liquefaction techniques of "HTI" from US and "Nedol" from Japan; also, large-scale Fischer-Tropsch techniques emerged, such as fixed fluidized-bed and three-phases suspended bed (SASOL). The most remarkable progress in this period was from SASOL, which increased its capacity of indirect coal liquefaction from 1 million tons/year to 6 million tons/year.

Due to the severe operation conditions for direct coal liquefaction by hydrogenation, it is a huge challenge for equipments' manufacture, operation safety and products' quality, so this technology has stayed on pilot experiments and demonstration operating level. The technology of coal's low temperature carbonization developed at the same time can reach 1 million to 3 million tons/year by one single train, but its industrialization procedure was prevented by low oil production rate (no more than 10%), high cost of tar treatment, low valuable semi-coke and serious environmental pollutions. In addition, petroleum price being unstable and not high enough for a long time also made direct coal liquefaction's development stagnant.

Recently, successful researches have boosted diversified worldwide CTL's development into industry level; besides, oil supply becomes shorter and shorter because of petroleum's great consumption and deficient storage. Industrializing CTL technology will be more and more compelling in the next 20 years.

Looking into modern CTL technology, large-scale coal carbonization's biggest challenges is to develop efficient and environment-friendly processes, to effectively manage and make use of atmospheric carbonization gas (including flue gas and combustible gas). Direct liquefaction by hydrogenation still faces some issues in equipments' fabrication, safe and stable operation, and low-quality diesel oil products etc.; for indirect liquefaction, although we surpass the obstacles of scale-up, safety and environment protection, the problem that too much coal is dedicated to per ton oil products remains because of the low heating value of gasification feedstock.

The invention in this article proposes, based on industrialized indirect coal liquefaction process, to partially liquefy carbonaceous solid combustible feedstock, especially low-rank coal and biomass, by moderate hydrogenation before entering to large-scale gasification stage, so that the light oil components of the feedstock are extracted and the highly condensed heavy oil components with great heating value are gasified to produce syngas. A portion of syngas is utilized to produce hydrogen ($H_2$) necessary for the process and the rest is treated by multistage liquefying of F-T synthesis oil technique. The above-mentioned staged liquefaction effectively combined the direct coal liquefaction by hydrogenation with Fischer-Tropsch reaction, thus achieving the efficiency optimization for the entire process of producing high quality oil from coal. The overall efficiency of this process is approved much higher than any other clean coal utilization method; besides, it yields excellent liquid fuel and chemical materials.

SUMMARY OF THE INVENTION

The object of the present invention is to provide a method for multistage liquefying carbonaceous solid fuel. It characterizes in that the solid fuel, especially the solid fuel feedstock rich in light components are hydrogenated under relatively mild conditions to carry out the partial liquefaction; the light oil components which represent 5% to 40% of the weight of the solid feedstock are extracted; the rest heavy liquefied products and unliquefied residues are then gasified to produce syngas, as a raw material, the syngas is subsequently converted via Fischer-Tropsch process to oil products mainly containing straight chain hydrocarbons. The afore-mentioned process provides a multistage transforming integrated system via the closely combination of residue slurry gasification, which will greatly improve the overall thermal efficiency and emission controls efficiency, thus a clean and efficient coal liquefaction process has been achieved.

The method for multistage liquefying carbonaceous solid fuel of the present invention can be summarized as the following steps:

1) One or several kinds of carbonaceous solid fuels powder is mixed with heavy oil to make carbonaceous solid fuel-oil slurry, the fuel-oil slurry is subsequently dehydrated by heating, and then partially liquefied by hydrogenation under a low-medium pressure to obtain light oil components and a heavy oil-residue slurry;
2) The light oil components from the step 1) are hydrorefined to yield refined oil;
3) The heavy oil-residue slurry from the step 1) is gasified to yield syngas;
4) The syngas from the step 3) is converted to F-T synthesis oil using conventional F-T synthesis process;
5) The F-T synthesis oil from the step 4) is then hydrorefined and hydrocracked to produce refined oil, which is then fractionated to yield high quality oil products including liquefied petroleum gas (LPG), gasoline, aviation kerosene, diesel oil and other relevant chemical products.

Alternatively, in the above method, wherein in the step 5), the refined oil obtained by hydrorefining and hydrocracking the F-T synthesis oil is combined with the refined oil obtained from the step 2), and then fractionated to prepare the oil products.

The carbonaceous solid fuel according to the method of this invention can be any coal having use value, including high quality coals such as bituminous coal and low-rank coals such as lignite; or any carbonaceous biomass including different kinds of agriculture and forestry waste like straws and woods, and biomass residues; or any solid material containing high heating value like organic sludge, especially solid fuel feedstock rich in light combustible components. The method according to this invention is quite adapted for utilization of various coals and biomass, in particularly, the method can make full use of low-rank coals (such as lignite) and biomass and solves the problems in the prior art that low-rank coals (such as lignite) and biomass are very difficult to be completely exploited.

Herein, for simplifying the expressions, the solid fuel-heavy oil slurry made from various carbonaceous solid fuels and heavy oil will be abbreviated as "fuel-oil slurry" hereinafter.

In the step 1) of the method according to the present invention, the solid fuel prepared into fuel-oil slurry is dehydrated and subsequently hydrogenated under mild conditions, wherein a residence time of said liquefaction by hydrogenation of said fuel-oil slurry ranges from 20 minutes to 1.5 hours, preferably 20 minutes to 1 hour; a yield of light oil components of said step accounts for 5 wt % to 40 wt %, preferably 5 wt % to 25 wt %, based on the total weight of said solid fuel, so as to achieve the object of partial liquefaction, wherein the light oil components mainly mean the liquid part of the light oil after the liquefaction by hydrogenation, especially $C_5^+$ components. Comparatively, the total yield of gaseous hydrocarbon and oil by conventional direct coal liquefaction by hydrogenation is usually between 50% and 70%.

In the step 1) of the method according to the present invention, the solid fuels and heavy oils with different heating values are mixed together to form fuel-oil slurry firstly. On one hand, the fuel are converted into liquid from solid, which makes further process easier to operate, for instance, it is much easier to dehydrate liquid fuel than solid fuel; on the other hand, the heating value of solid fuel is increased, which is more important for low-heating-value fuels such as low-rank coal (especially for lignite) and biomass, since said treatment transforms the feedstock which cannot be directly liquefied by hydrogenation into feedstocks which are available for directly liquefying by hydrogenation. Taking lignite for example, its heating value is normally about 4000 kcal/kg, but this value of the fuel-oil slurry made by lignite can reach at 6000-8500 kcal/kg. The solid content of said fuel-oil slurry prepared by the method of this invention is from 10 wt % to 70 wt %, preferably 20 wt % to 65 wt %, more preferably 40 wt % to 65 wt %, based on the total weight of said fuel-oil slurry. In the above mentioned step 1), said dehydration by heating the fuel-oil slurry is performed at a temperature of 100° C. to 200° C., preferably 150° C. to 200° C. to remove the moisture, then further heated to 350° C. to 450° C., the fuel-oil slurry enters hydrogenation reactor for partial liquefaction by hydrogenation.

In the step 1) of the method according to the present invention, the expression of "hydrogenation under a low-medium pressure" means that the hydrogenation of said fuel-oil slurry is performed under mild conditions, preferably performed at a pressure of less than 50 atm and a temperature of lower than 470° C., more preferably at a pressure between 10 atm to 50 atm and a temperature between 350° C. to 450° C.

In the step 1) of the method according to the present invention, said heavy oil for making said fuel-oil slurry is the heavy oil separated from said heavy oil-residue slurry, a product of said hydrogenation of the step 1); said heavy oil can be directly used as the feedstock for preparing fuel-oil slurry, or partially or completely hydrogenated before making slurry to increase light oil production yield of slurry hydrogenation.

In the hydrogenation process of the step 1) of the method according to the present invention, any conventional hydrogenating catalysts in the art can be employed, preferable the spent catalyst of the F-T process, which can catalyze the hydrogenation of fuel-oil slurry and improve light oil yield.

The reactors used in the above mentioned hydrogenation process can be any common hydrogenating reactor in this art, preferably, the high throughput three-phase suspended bed reactor (FIGS. 2(a) and 2(b)) described in this invention can be used.

In the step 1) of the method according to the present invention, the fuel-oil slurry is dehydrated by heating and hydrogenated under a low-medium pressure for liquefying, consequently, light oil products, liquefied heavy components and unliquefied residues are obtained; the liquefied heavy components and unliquefied residues are referred to as "heavy oil-residue slurry" ("oil-residue slurry" hereinafter). The heavy oil-residue slurry is a mixture of liquid heavy oil, asphalt components, pre-asphalt components and unliquefied coal residues. Heavy oil separated also called "circulating oil", can be used as the feedstock for preparing the said fuel-oil slurry. Before making slurry, this circulating oil can be completely or partially hydrogenated to increase light oil production yield of slurry hydrogenation. In another way, the slurry of said heavy oil-residue slurry after a light oil extraction process is spray-cooled into solid powder, then made into coal water slurry (CWS) for producing syngas by gasification or as boiler fuel for producing power steam. The water employed in CWS preparation can be any conventional industrial water, preferably using the oily waste water derived from each process of the multistage transforming in the present invention to ensure the comprehensive utilization and environment-friendly production.

The yield of light oil from the hydrogenation of fuel-oil slurry in the step 1) can be 5 wt % to 40 wt % of the solid additives, preferably between 5 wt % and 25 wt %; the yield of light oil can be controlled according to the properties of the feedstock and production requirements so as to achieve the optimal productivity and heat efficiency. For the feedstock with a high yield of light oil such as lignite, bituminous coal and biomass, the method of this invention can produce proper amount of light oil during the stage of partial liquefaction by hydrogenation, and also increase the heating value and gasification efficiency of the oil-residue slurry. For those coals with a high metamorphic grade such as anthracite and meager lean coal, this invention favors the yield of heavy oil-residue slurry with high heating value, so that the gasification efficiency of the heavy oil-residue slurry can be greatly improved; if necessary, the small quantity of light oil generated in partial liquefaction by hydrogenation (approximate 5%) can be mixed with heavy oil as solvent of coal oil slurry (COS) to yield syngas by gasification.

The hydrorefining process described in the step 2) can carried out by conventional methods and equipments in the art; the syngas preparing process by gasification of heavy oil-residue slurry in the step 3) can also use the common methods and equipments for coal gasification in the art; both the process of syngas to F-T synthesis oil in the step 4) and the process of hydrorefining and hydrocracking of said F-T synthesis oil in the step 5) can use the conventional methods and equipments as well in F-T synthesis field.

The method according to this invention can produce all kinds of high-quality oil products which can be obtained by the available methods in the art, including various products in coal chemical industry and petrochemical industry fields, especially LPG, gasoline, aviation kerosene, diesel oil or other chemical products, and said other chemical products include lubricating oil and the like.

Preferably, the present invention provides a method for multistage liquefying carbonaceous solid fuel, wherein said method comprises the following steps:

1) One or several kinds of carbonaceous solid fuel powders are mixed with heavy oil to make fuel-oil slurry, which is subsequently dehydrated by heating at 150° C. to 200° C., and then partially liquefied by hydrogenation under a pressure of 10 atm to 50 atm and a temperature of 350° C. to 450° C., then light oil components and heavy oil-residue slurry are separated;
2) The light oil components from the step 1) are hydrorefined to yield refined oil;
3) The heavy oil-residue slurry from the step 1) is introduced into a pressurized gasifier at a temperature of 100° C. to 400° C. to perform the gasification reaction with oxygen at 1000° C. to 1800° C. to produce syngas;
4) The syngas from the step 3) is treated by conventional process and then converted to F-T synthesis oil using conventional F-T synthesis process; and
5) The F-T synthesis oil from the step 4) is hydrorefined and hydrocracked to produce refined oil, and then fractionated to yield high quality oil products including LPG, gasoline, aviation kerosene, diesel oil or other chemical products.

More preferably, in the step 5) of the above method, the refined oil obtained by hydrorefining and hydrocracking the F-T synthesis oil is combined with the refined oil obtained from the step 2), and then fractionated to prepare high-quality oil products.

In the step 1) of the method according to the present invention, the heavy oil used for preparing fuel-oil slurry is those separated from heavy oil-residue slurry. In the hydrogenation process, preferably, the spent catalyst of the F-T process is used as the catalyst of this process, which can catalyze the hydrogenation of fuel-oil slurry and improve light oil yield. The reactors used in the above mentioned hydrogenation process can be any common hydrogenating reactors in this field, preferably, the high throughput three-phase suspended bed reactor described in this invention can be used.

In the step 3) of the method according to the present invention, the heavy oil-residue slurry is fed into a gasifier at a temperature of 100° C. to 400° C. to perform gasification to produce syngas, the gasifying conditions such as pressure and temperature can be conventional conditions, for instance, the gasification can be carried out with oxygen under a pressure of 50 atm and a temperature of 1000° C. to 1800° C. The heating value of said heavy oil-residue slurry is in a range of 3000 kcal/kg to 10000 kcal/kg, preferably, in a range of 6000 kcal/kg to 9000 kcal/kg.

In the method according to the present invention, the conventional treatment of syngas mentioned in the step 4) includes common shift conversion and acid gas removal in the field of syngas production. The syngas after the conventional treatment can be used to produce F-T synthesis oil or hydrogen ($H_2$), the hydrogen produced can be used as make-up hydrogen for the hydrogenation process of the step 1).

In the step 4) of the method according to the present invention, as a feedstock, the complete or partial syngas is converted to F-T synthesis oil by conventional Fischer-Tropsch methods and equipments. The obtained F-T synthesis oil is pretreated by conventional operations such as shift conversion and cleaning, and then is hydrorefined and hydrocracked to yield refined oil, the refined oil then be fractionated to produce high-quality oil products mainly containing straight chain hydrocarbons, including LPG, gasoline, aviation kerosene, diesel oil and other chemical products. Preferably, the refined oil obtained by hydrorefining and hydrocracking in the step 4) is combined with that obtained in the step 2), and then fractionated to produce said high-quality oil products. The afore-mentioned Fischer-Tropsch process can use the conventional methods and equipments in this field, such as the three-phase suspended bed F-T synthesis process and the equipments thereof disclosed by Synfuels China (Chinese patent application number: CN200710016 1575.1 or International patent application number: PCT/CN2007/002941).

The high-quality oil products of this invention include LPG, gasoline, aviation kerosene, diesel oil and many special oils such as lubricant base oil, as well as various chemical products produced by F-T synthesis process. The high-quality oil products is low sulfur and low nitrogen, preferably, sulfur content is less than 6 ppm and nitrogen content is less than 10 ppm. A octane number of the gasoline in this invention is between 90 and 98; a specific gravity of said aviation kerosene ranges from 0.74 to 0.83, and a cold filter plugging point ranges from −66° C. to −49° C.; or a cetane number of said diesel oil is from 55 to 70, and a cold filter plugging point is from −45° C. to 0° C.

In this invention, comprehensive utilizations can be applied in many manufacture sections to increase productivity and make the process more environment-friendly. For instance, if necessary, the heavy oil-residue slurry separated from the step 1) can be transformed by spray cooling into solid powder, which can be subsequently used as feedstock in the form of CWS for producing syngas by gasification or as boiler fuel for producing power steam; the water employed in CWS preparation can preferably use the oily waste water derived from each process of the present invention, especially the F-T process, so as to ensure the reasonable utilization of the waste water and achieve the object of comprehensive utilization and green production; a portion of syngas derived from the step 3), after some conventional operations like shift conversion and acid gas removal, is dedicated to the production of hydrogen ($H_2$), the hydrogen produced can be used as make-up hydrogen for the hydrogenation process of the step 1). The removed pollutants like sulfur(S) and nitrogen (N) from solid fuel such as coal in purification process and hydrogenation process of the fuel-oil slurry can be respectively recovered and utilized in the form of sulfur and ammonia, so that an environment-friendly production mode can be realized and also the utilization rate of combustible material in solid fuel is improved.

Another object of this invention is to supply a use of the above-mentioned multistage liquefying techniques of said solid fuel. The multistage liquefying process of this invention can be widely applied to many different kinds of coal and various sources of biomass. Comparing with available techniques of coal liquefaction in the prior art, this process increases the utilization rate of the fuel, particularly solves the problems in utilizing low-heating-value coal and biomass. The method of this invention is very suitable for high-volatile coal, especially for lignite.

For the low-volatile coals, the partial liquefaction by hydrogenation of the method of this invention mainly generates the high-heating-value oil-residue slurry, thereby improves the efficiency of producing syngas by slurry gasification; a small amount of light oil can also be allowed to mix with oil-residue slurry to be gasified. When the produced syngas is converted to high-quality oil by F-T process, the role of the partial liquefaction is to ameliorate the efficiency of producing syngas.

For the high-volatile coals and biomass, the method according to this invention produces appropriate amount of light oil, improves the heating value of oil-residue slurry and increases the gasification efficiency during the step of partial liquefaction by hydrogenation; In combination with the following F-T synthesis section, the overall efficiency of this process has been optimized. The multistage conversion not only improves the efficiency of producing syngas by gasification, but also multiplies the yield of oil products; the light oil generated in partial liquefaction by hydrogenation enriches the components of oil products by indirect liquefaction, which helps to yield different kinds of high-quality liquid fuels.

The multistage liquefaction of this invention can convert a variety of carbonaceous solid fuels into clean oil products with low sulfur and low nitrogen, including LPG, gasoline, aviation kerosene, diesel oil and various chemical products. It is very meaningful for improving the utilization efficiency of carbonaceous solid fuel including coal and reducing the pollution, particularly for making use of lignite and biomass resources.

The multistage liquefaction of this invention completely changes the production mode of traditional coal gasification by converting the solid fuels such as lignite with low heating value into liquid fuels with high heating value, i.e. fuel-heavy oil slurry, consequently, it greatly increases the efficiency of producing syngas by gasification and uses the coal with low heating value sufficiently as well. The practical application of the multistage liquefaction of this invention will bring significant effects on future energy structure, especially on that of the areas of lacking of high quality energy resources.

Specifically, the multistage liquefaction of this invention is suitable for a variety of carbonaceous solid fuels, such as coal and biomass with different qualities, and greatly improves their utilization efficiency. Taking coal as an example, the overall efficiency (a ratio of heating value of the produced oil products to heating value of the raw coal) is elevated from about 38%-48% to 45%-65%, and the ratio varies with the quality of various coals; more specifically, when the multistage liquefaction of this invention is applied to high-quality coal with a heating value more than 6000 kcal/kg such as high quality bituminous coal and sub-bituminous coal, the overall efficiency, including imported power, can arrive at 50% to 65%, which means the consumption of such CTL plant are maintained around 2.8 to 3.3 tons coal/ton oil. Comparing to that of a modern coal based power station, the overall efficiency has been improved by 10% to 20%. This invention can also liquefy the lignite with a heating value of around 4000 kcal/kg and an ash content less than 13%, which is difficult for full utilization at present, the efficiency can be elevated to 45%-56%.

The key points of this multistage liquefaction process are as follows: (1) before the production of syngas, partial liquefaction by hydrogenation of carbonaceous feedstock is performed for recovering a portion of light oil; (2) the heavy-oil obtained by partial liquefaction is mixed with said carbonaceous solid fuel to form fuel-oil slurry with higher heating value; (3) the heavy oil-residue slurry obtained after separating light oil therefrom is used to produce syngas, which is subsequently used to yield oil products or other products by F-T synthesis. Hence, this multistage liquefaction process can efficiently convert carbonaceous solid fuel into oil products, but the different parts of this process can also be employed for other purposes.

As stated previously, the advantages of the multistage liquefaction process of this invention are as follows:

1. various carbonaceous solid fuels, such as different kinds of coal, especially various low-rank coals such as lignite and biomass, can be employed as feedstock in this invention, so that the abundant lignite resource and renewable resources with high efficiency are adequately utilized, and the utilization efficiency is greatly improved as well; particularly, this invention provides an advanced technique solution for environment-friendly and efficiently using carbonaceous solid fuels with low heating values, such as lignite and biomass, which are difficult to utilize efficiently by the prior art, wherein the most important technique improvement is to mix carbonaceous solid fuels with different heating values and heavy oil for producing fuel-oil slurry with high heating value, and the advantages thereof are as follows:
   1) Converting the solid fuel into liquid fuel makes the following operations easier, for example, the dehydration of liquid fuel is much simpler than that of solid fuel.
   2) The liquid fuel obtained by mixing different carbonaceous solid fuel with heavy oil has a higher heating value, which meets the requirement for heating value of gasification and improves the efficiency of syngas production. For instance, generally, lignite has a heating value of about 4000 kcal/kg, while this value of the fuel-oil slurry made from lignite can be 6000-8500 kcal/kg.
   3) In case of the utilization efficiency of the fuel, the feedstock is promoted more efficiently due to the simplification of the dehydration of feedstock such as lignite and biomass, so that the utilization efficiency is also greatly elevated.
   This is a substantial improvement for the utilization of carbonaceous solid fuels with low heating values such as lignite. This invention combines the direct coal liquefaction by hydrogenation with F-T synthesis process, thereby gaining an optimal overall efficiency of CTL process.
2. The first step of this invention intends to partially liquefy the feedstock, which greatly reduce the operation burden of a complete liquefaction by hydrogenation, so that the operation security can be ensured.
3. The partial liquefaction by hydrogenation and indirect liquefaction of the solid feedstock are mutually complementary and optimally integrated in this invention, accordingly, the overall efficiency and the oil yield per ton coal are greatly improved; besides, the process of this invention, which realizes an efficient and green manufacture of coal liquefaction, can give out all the products involved in petroleum chemical industry, thus, it is a good complement for petroleum shortage.
4. The entire process of this invention contains cyclic utilization of a lot of materials and heat, which ensure the comprehensive utilization of feedstock and eco-friendly production. For example, using heavy oil as feedstock of fuel-oil slurry, preparing hydrogen ($H_2$) needed by the system from a portion of syngas, preparing coal water slurry from oily waste water generated by the process, and so on.

Another object of this invention is to provide a high throughput three-phase suspended bed reactor suitable for liquefaction by hydrogenation of the fuel-oil slurry, which comprises:
1) Main body of the reactor;
2) Inlet system and outlet system of circulating hydrogen;
3) Inlet system and outlet system of the feedstock slurry; and
4) Cooling heat exchanger.

In the manufacturing process of the present invention, said reactor is used to hydrogenate heavy fuel-oil slurry.

The reactor of the present invention comprises the following parts: an inlet system of circulating hydrogen provided at the bottom of the main body of the reactor; a cooling heat exchanger provided in the gas-phase space at the upper part of the reactor; an inlet using fuel-oil slurry as a feedstock for hydrogenation provided at the mid-upper part of the reactor; an outlet of the resultant product (oil-residue slurry) after hydrogenation provided at the bottom of the reactor.

The liquefaction by hydrogenation in the reactor of the present invention is as follows: the fuel-oil slurry feedstock is fed into the reactor at the inlet provided at the mid-upper part of the three-phase slurry bed of the reactor; the circulating hydrogen enters into the reactor from the inlet system provided at the bottom of the reactor and is bubbled through the three-phase slurry bed, where the hydrogenation reaction of fuel-oil slurry takes place. The circulating hydrogen after hydrogenation, carrying part of oil products and the gas produced by hydrogenation enters into the gas-phase space at the upper part of the reactor, where the gas is cooled by the cooling heat exchanger provided in the gas-phase space. Then, high temperature gas, produced by condensing and separating part of the entrained heavy oil, returns to the three-phase slurry bed and withdraws the reactor from the outlet of circulating hydrogen provided at the top of the reactor. The oil-residue slurry after hydrogenation reaction goes out of the reactor via the outlet of oil-residue slurry provided at the bottom of the reactor in order to maintain the adequate liquid level of the three-phase slurry bed.

This invention provides two types of reactor designs, wherein the difference thereof is the inlet system of circulating hydrogen. Other parts of the three-phase suspended bed of the present invention including main body, slurry feedstock inlet and outlet system, cooler or heat exchanger provided at the top of the reactor can adopt the common designs of available suspended bed reactors. The other parts of the two reactors except the inlet system of circulating hydrogen can be same or different, but the only rule for different designs is that these designs can fulfill the partial liquefaction of fuel-oil slurry by hydrogenation.

In terms of design, the amount of the circulating hydrogen should meet two requirements: firstly, the volume ratio of hydrogen to fuel-oil slurry feedstock is more than 600 during the operation of the reactor; secondly, the superficial velocity of the gas (under reactive condition) within the three-phase suspended bed reactor is between 0.15 m/s and 0.4 m/s, preferably between 0.2 m/s and 0.3 m/s. The design of the main body of the reactor should also ensure that the residence time of fuel-oil slurry feedstock in the three-phase suspended bed should be more than 20 minutes, generally about 20 minutes to 1.5 hours, preferably 20 minutes to 1 hour.

Specifically, this invention provides a three-phase suspended bed reactor for the liquefaction of fuel-oil slurry by hydrogenation, and it is used in the process of partially liquefying the carbonaceous solid fuel-heavy oil slurry by hydrogenation in the step 1) of the method according to the present invention; the reactor includes an inlet system of circulating hydrogen provided at the bottom of the main body of the reactor; a cooling heat exchanger provided in the gas-phase space at the upper part of the reactor; an inlet provided at the mid-upper part of the reactor; an outlet of circulating hydrogen provided at the top of the reactor and an outlet of reacting slurry provided at the bottom of the reactor.

Said reactor is characterized in that said inlet system of circulating hydrogen consists of a Venturi tube feeder, a feeding tube and a slurry downcomer tube, which are provided at the bottom of the reactor; and the feeding tube is positioned tangentially to the wall of the main body of the reactor while entering the reactor; or Said inlet system of circulating hydrogen consists of a feeding tube, a free space and a gas distributor, which are provided at the bottom of the reactor.

In one embodiment of the invention, the inlet system of circulating hydrogen of the reactor according to the invention is follows: said inlet system of circulating hydrogen consists of a Venturi tube feeder, a feeding tube and a slurry downcomer tube, which are provided at the bottom of the reactor. The feeding manner of said inlet system is: the suction effect generated in the Venturi tube feeder caused by feeding circulating hydrogen brings quantities of slurry into the circulating hydrogen feeder, which makes the slurry circulate at the bottom of the reactor; and when the slurry enters into the reactor in the direction tangential to the wall of the reactor, a vortex is formed so that a strong stirring turbulence appears in the three-phase suspended bed, consequently, a homogeneous blending zone are formed to avoid from forming dead zone and coking.

In another embodiment of the invention, said inlet system of circulating hydrogen consists of a feeding tube, a free space and a gas distributor, which are provided at the bottom of the reactor. In this system, the circulating hydrogen enters the three-phase suspended bed directly via the gas distributor, producing a high speed spurt hydrogen flow near the gas distributor, which causes a very powerful agitation at the bottom of the three-phase suspended bed to avoid coking.

BRIEF DESCRIPTION OF THE DRAWINGS

Main equipment units involved in FIG. 1 are listed as follows:
1 Three-phase suspended bed reactor
2 Heating furnace
3 First heat exchanger
4 High temperature gas-liquid separator
5 Second heat exchanger
6 Air cooler
7 Low temperature gas-liquid separator
8 Hydrogen compressor
9 Atmospheric-vacuum separation unit
10 Fuel-oil slurry preparation and dehydration unit
11 Gasification unit
12 Coal water slurry preparation unit
13 Syngas shift conversion/purification unit
14 F-T synthesis unit
15 Hydrogen generation unit
16 Oil product hydrogenation unit

Figure 2:
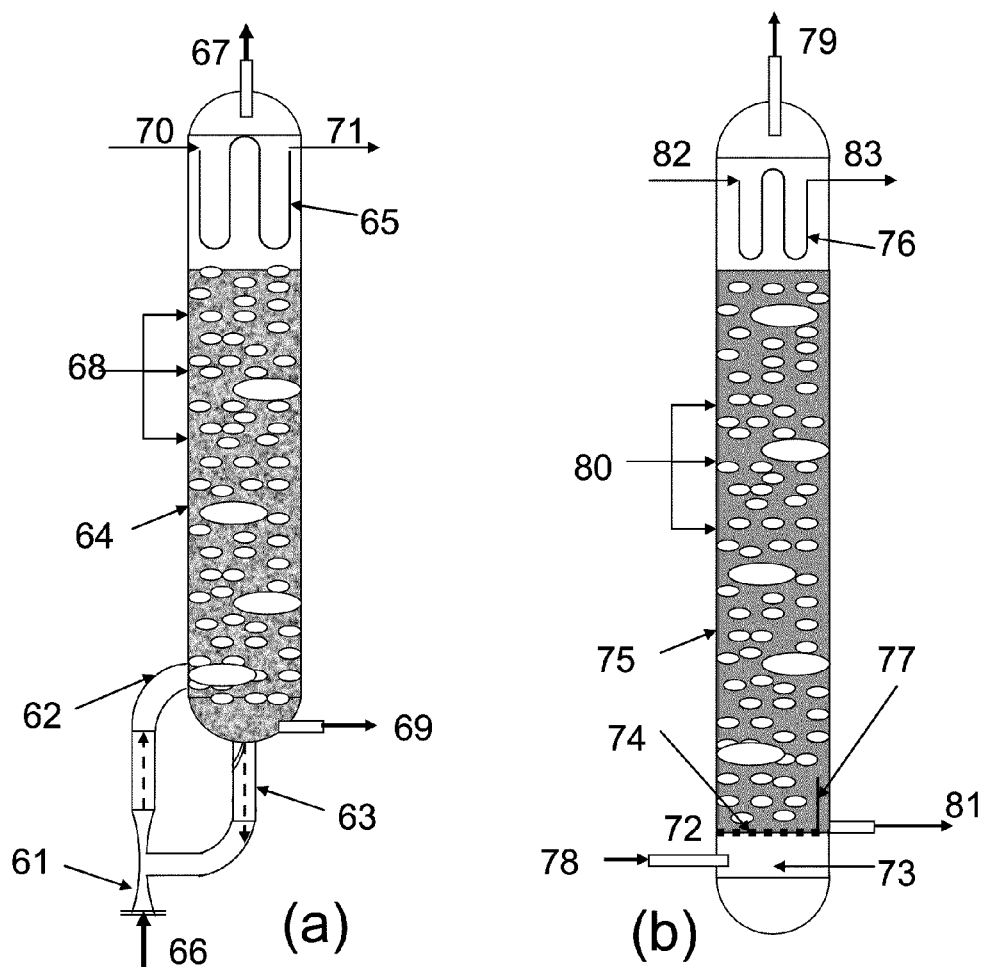
FIG. 2(a) and FIG. 2(b) depict respectively the principle of the two embodiments of the designs of three-phase suspended bed reactor for fuel-oil slurry hydrogenation.

The main equipment units and material streams involved in FIG. 2(a) are listed as follows:
61 Venturi tube feeder
62 Feeding tube
63 Slurry downcomer tube
64 Main body of reactor
65 Cooling heat exchanger
66 Circulating hydrogen feeder
67 Outlet of circulating hydrogen
68 Feedstock slurry feed
69 Outlet of reaction slurry
70 High-pressure hot water
71 High-pressure steam The main equipment units and material streams involved in FIG. 2(b) are listed as follows:
72 Feeding tube
73 Free space
74 Gas distributor
75 Main body of reactor
76 Cooling heat exchanger
78 Circulating hydrogen feeder
79 Outlet of circulating hydrogen
80 Feedstock slurry feed
77/81 Outlet of reaction slurry
82 High-pressure hot water
83 High-pressure steam

DETAILED DESCRIPTION OF THE INVENTION

The multistage liquefaction method of this invention will be further explained accompanying with FIGS. 1, 2(a) and 2(b) hereinafter.

Figure 1:
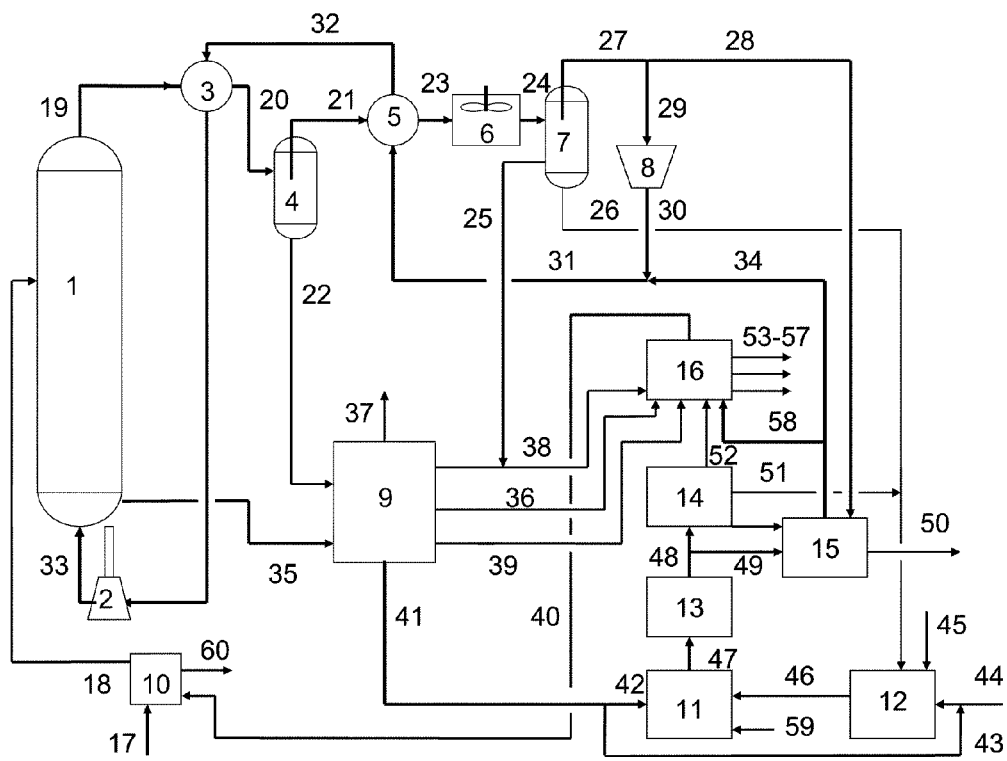
FIG. 1 shows the flowchart of the multistage liquefaction process of the present invention for carbonaceous solid fuel.

As can be seen from FIG. 1, the main equipment units involved in the multistage liquefaction process are: three-phase suspended bed reactor 1 (also referred to as hydrogenating reactor or reactor) for the hydrogenation of carbonaceous solid fuel-heavy oil slurry, heating furnace 2 for heating circulating hydrogen, first heat exchanger 3 for circulating hydrogen, high temperature gas-liquid separator 4, second heat exchanger 5 for circulating hydrogen, air cooler 6, low temperature gas-liquid separator 7, hydrogen compressor 8, atmospheric-vacuum separation unit 9 for hydrogenation liquefied products, preparation and dehydration unit 10 for fuel-oil slurry, gasification unit 11 for producing syngas by gasifying oil-residue slurry or coal water slurry, coal (residue) water slurry preparation unit 12, syngas shift conversion/purification unit 13, F-T synthesis unit 14, hydrogen generation unit 15 and oil product hydrogenation unit 16.

The process of multistage liquefaction of solid fuels according to the invention is performed as follows: in the fuel-oil slurry preparation and dehydration unit 10, the solid fuel-heavy oil slurry made from the mixture of solid fuel powder 17 and circulating oil (i.e. heavy oil) 40 is dehydrated by heating and heated to 300-380° C., then entered into the reactor from the feed inlet provided at the upper part of the three-phase bed of the hydrogenating reactor 1. At a temperature of about 350-450° C., the slurry is partially liquefied by a hydrogenating reaction with the circulating hydrogen 33, the circulating hydrogen 33 is previously heated to more than 400° C. in heating furnace 2 and enters into the reactor at the bottom of the reactor and is bubbled through the three-phase suspended bed to perform liquefaction by hydrogenation. The resulting mixture of hydrogen and a portion of light components are separated from the slurry in the gas-phase space at the upper part of the reactor, where the mixture is cooled to 300-350° C. by the cooler provided in this space, consequently, the heavy-oil therein is further separated. The hot reaction outlet gas flow 19 flow withdraws the hydrogenating reactor via the top outlet of the reactor 1. The slurry 35 drawn out from the bottom of the reactor 1 is fed to atmospheric-vacuum separation unit 9 so that the liquefied products by hydrogenation are separated.

The hot reaction outlet gas flow 19 containing a small amount of entrained slurry is cooled to 200-280° C. by exchanging heat in the first heat exchanger 3 for circulating hydrogen with circulating hydrogen 32, as a result, a portion of hydrogenating product is condensed so that a gas-liquid 2-phase stream 20 is formed; Said gas-liquid 2-phase stream 20 enters high temperature gas liquid separator 4 where the condensate and a portion of the entrained slurry are separated by the gas. The condensate 22 mainly comprising oil generated from hydrogenation and the entrained slurry contaminant is fed to separate unit 9. The gas flow 21 obtained by separating liquid from high temperature gas liquid separator 4 exchanges heat with cold circulating hydrogen 31 in the second heat exchanger 5 for circulating hydrogen, and then the gas flow 23 obtained enters into the air cooler 6 for further cooling, where after, the condensed stream 24 consisting of light oil generated by hydrogenation and water is introduced into the low temperature gas-liquid separator 7 to separate the light oil and water to separate clean light oil 25, which is fed into oil product hydrogenation unit 16 for further treatment, and water 26, which is fed to the coal water slurry preparation unit 12 as a feedstock to prepare a coal slurry for gasification. The gas flow 27 from the low temperature gas-liquid separator 7 is divided into 2 portions: the major flow 29 is compressed in hydrogen compressor 8 to obtain hydrogen flow 30, which is mixed with the make-up hydrogen flow 34 from the hydrogen generation unit. The mixed hydrogen flow 31 is introduced into the second heat exchanger 5 for circulating hydrogen to exchange heat with gas flow 21, and the hydrogen flow 32 released from the second heat exchanger 5 exchanges heat with the reaction outlet gas flow 19 in the first heat exchanger 3, then the resulted hydrogen flow is reheated in the heating furnace to obtain the hydrogen flow 33 of circulating hydrogen; the minor gas flow 28 is introduced as tail gas of coal slurry hydrogenation into hydrogen generation unit 15 for recovering liquefied petroleum gas (LPG), light oil, hydrogen and fuel gas.

The reaction slurry 35 drawn out from the hydrogenating reactor 1 and the condensate 22 contaminated by a small amount of the entrained slurry from the high temperature gas liquid separator 4 are introduced to the separation unit 9 for separate gasoline distillate 38, diesel oil distillate 36 and heavy oil distillate 39. All of the three kinds of distillate are fed to hydrogenation unit 16 for hydrogenation, and a small amount of generated gas 37 enters hydrogen generation unit for its disposal. The oil-residue slurry 41 withdrawing from the bottom of the vacuum distillation column of the atmospheric-vacuum separation unit 9 is divided into two portions: one portion 42 is introduced to gasification unit 11 for gasifying; the other portion 43 goes to coal water slurry preparation unit 12 for sprayed cooling to prepare coal water slurry 46 for gasification or directly as furnace fuel. The mentioned heavy oil distillate 39 can be used directly as heavy oil (i.e. circulating oil) for preparing fuel-oil slurry; or can be firstly hydrogenated at the hydrogenation unit before going to the fuel-oil slurry preparation. FIG. 1 depicts the latter technical solution.

The oxygen 59 from oxygen generation unit and the oil-residue slurry 42 from the atmospheric-vacuum separation unit 9 are put together in gasification unit 11 for yielding syngas 47 by gasification. The syngas is treated by the syngas shift conversion/purification unit 13, and the product obtained is divided into two flows: one flow 48 is introduced into F-T synthesis unit 14 as a feedstock of straight chain hydrocarbon-based oil products for producing F-T synthesis oil 52; the other flow 49 is fed to hydrogen generation unit 15 for generating hydrogen, a portion of the resultant hydrogen flow 58 from this unit is used as the hydrogen feedstock for hydrogenation unit 16; the other portion of the hydrogen flow 34 serves as make-up hydrogen in coal slurry hydrogenation after treatment. The oil products obtained in hydrogenation unit 16 include product flows 53-57 of LPG, gasoline, aviation kerosene, diesel oil and some other relevant chemical products.

In FIG. 1, the hydrogenation unit refers to an integration of several downstream hydrogenation processes of the present invention, wherein it comprises light oil 25 hydrorefining unit, F-T synthesis oil 52 hydrorefining and hydrocracking unit, probably existing heavy oil (heavy oil distillate 39) hydrogenation unit, fractionation equipments and some ancillary facilities thereof.

In the above-mentioned processes, the hydrogen flow 37 separated from the atmospheric-vacuum separation unit 9 and hydrogen flow 50 generated from hydrogen generation unit are used as fuel gas for the furnaces of the whole plant after some necessary treatments. All of the oily waste water obtained from the above processes, including the water flow 26 from the low temperature gas-liquid separator 7, the waste water 51 from the F-T synthesis unit and the waste water 60 of the fuel-oil slurry preparation and dehydration unit 10, can be employed in coal water slurry preparation. The pure oxygen flow (purity: 99.6%) 59 required in the gasification section of syngas production process is separated from the compressed air in the air separation workshop of the plant.

In the aforementioned multistage liquefaction process, the aforementioned "mild condition" for fuel-oil slurry hydrogenation process means that the pressure is less than 50 atm whilst the temperature is lower than 470° C.; the solid content of the slurry made from solid fuel is from 10 wt % to 70 wt %, preferably from 20 wt % to 65 wt %, more preferably from 40 wt % to 65 wt %. The light-oil derived from the fuel-oil slurry hydrogenation process amounts to 5 wt % to 40 wt % of solid additives, preferably 5 wt % to 25 wt % of solid additives; the heating value of the oil-residue slurry obtained from the fuel-oil slurry after being generated and drawn out the light-oil ranges from 3000 kcal/kg to 10000 kcal/kg, preferably from 6000 kcal/kg to 9000 kcal/kg, so as to elevate the efficiency of syngas production.

In the aforementioned multistage liquefaction process, any of the conventional F-T synthesis processes and equipments can be utilized in the F-T synthesis unit 14, preferably using the three-phase suspended bed F-T synthesis process and the reactor (China patent application number: 200710161575.1 or International patent application number PCT/CN2007/002941) of Synfuels China; the spent catalyst used in said F-T synthesis process can be used as catalyst in fuel-oil slurry liquefaction reaction hydrogenation.

In the aforementioned multistage liquefaction process, the feedstock of circulating oil for preparing fuel-oil slurry is the heavy oil separated from the heavy oil-residue slurry from the partial hydrogenating liquefaction unit. This heavy oil can be immediately used for preparing fuel-oil slurry, or partially or completely hydrogenated before being made into the slurry so as to increase the light oil yield of slurry hydrogenation.

The key points of this multistage liquefaction process are to partially liquefy solid fuel by hydrogenation to recover part of the light oil before producing syngas; the resultant syngas can be used to yield F-T synthesis oil by using F-T synthesis process, or used for producing other products. Hence, this multistage liquefaction process is able to efficiently convert carbonaceous solid fuel into oil products, but the uses of each integrated part are not limited to these.

The partial hydrogenating liquefaction of the fuel-oil slurry of this invention can performed by using any conventional hydrogenating reactor with the similar design, preferably by using the high throughput three-phase suspended bed reactor mentioned by the present invention. This invention provides two designs of the high throughput three-phase suspended bed reactor, which will be described accompanying with FIG. 2(a) and FIG. 2(b).

FIG. 2(a) and FIG. 2(b) depict two designs of the high throughput three-phase suspended bed reactor of the present invention, wherein the main difference between the two designs is the feeding manner of the circulating hydrogen.

FIG. 2(a) provides one embodiment of the reactor of this invention, it mainly comprises: the inlet system of circulating hydrogen provided at the bottom of the reactor, which consists of a Venturi tube feeder 61, a feeding tube 62 and a slurry downcomer tube 63; a circulating hydrogen feeder 66 provided at the bottom of the main body of the reactor 64 and an outlet of circulating hydrogen 67 provided at the top of the main body of the reactor 64; a cooling heat exchanger 65 in the gas-phase space provided at the upper part of the reactor; a hydrogenation feedstock (i.e. fuel-oil slurry) feeder 68 provided at the middle-upper part of the reactor and an outlet of hydrogenation product (i.e. oil-residue slurry) 69 provided at the bottom of the reactor.

In the embodiment of FIG. 2(a), the inlet system of circulating hydrogen consists of a Venturi tube feeder 61, a feeding tube 62 and a slurry downcomer tube 63, which are provided at the bottom of the reactor; the feeding tube 62 is positioned tangentially to the wall of the main body of the reactor 64. The feeding manner of said system is: the suction effect generated in the Venturi tube feeder caused by feeding circulating hydrogen brings quantities of slurry into the circulating hydrogen feeder 66, the slurry circulates along 63-61-62; since the feeding tube 62 is in the direction tangential to the wall of the reactor 64, a vortex is formed so that a strong stirring turbulence appears in the three-phase suspended bed, consequently, a homogeneous blending zone are formed to avoid from forming dead zone and coking.

FIG. 2(b) refers to another embodiment of the reactor of this invention, it is mainly comprises: the inlet system of circulating hydrogen provided at the bottom of the reactor, which consists of a feeding tube 72, a free space 73 and a gas distributor 74; a circulating hydrogen feeder 78 provided at the bottom of the main body of the reactor 75 and an outlet of circulating hydrogen 79 provided at the top of the main body of the reactor 75; a cooling heat exchanger 76 provided in the gas-phase space provided at the upper part of the reactor; a hydrogenation feedstock (i.e. fuel-oil slurry) feeder 80 provided at the middle-upper part of the reactor and outlets of hydrogenation product (i.e. oil-residue slurry) 77/81 provided at the bottom of the reactor.

In the embodiment of FIG. 2(b), the inlet system of circulating hydrogen consists of a feeding tube 72, a free space 73 and a gas distributor 74, which are provided at the bottom of the reactor. The feeding manner of said system is: the circulating hydrogen feeder 78 is introduced into the free space 73 positioned at the bottom of the reactor and subsequently enters the three-phase suspended bed directly via the gas distributor 74, producing a high speed spurt near the gas distributor, which causes a very powerful agitation at the bottom of the three-phase suspended bed to avoid coking.

Besides the inlet system of the circulating hydrogen, other parts of the three-phase suspended bed reactor in this invention can adopt the common designs in this field, these parts can be same or different, but the only rule for different designs is that these designs can fulfill the partial liquefaction of fuel-oil slurry by hydrogenation.

Taking the processes involved in the equipment depicted in FIG. 2(a) for example, the feedstock slurry (i.e. fuel-oil slurry) feeder 68 is divided into multi-flows in the upper part of the three-phase suspended bed and introduced into the reactor. The outlet of reaction slurry 69 is led out from the reactor below the inlet of circulating hydrogen (i.e. feeding tube 62) provided at the bottom of the reactor. The above configuration ensures enough residence time in the reactor for the partial hydrogenating liquefaction of the feedstock slurry. The circulating hydrogen is bubbled through the three-phase suspended bed 64 of the main body of the reactor, leaves the slurry bed layer from the upper part and enters into the gas-phase space at the upper part of the reactor, wherein the gas is cooled by the cooling heat exchanger 65, consequently, most of the heavy products are condensed and returned to the three-phase suspended bed layer of the reactor and the effluent from the outlet of circulating hydrogen 67 is released from the top of the reactor. The heat medium in heat exchanger tube of the cooling heat exchanger 65 is high pressure hot water 70, which turns into high pressure vapor 71 with a pressure of about 50 atm after heat exchanging. This high pressure vapor can be used circularly as the power steam. The partial hydrogenating liquefaction of this invention is a low exothermic reaction, therefore, the internal temperature of the reactor can be effectively controlled by regulating the temperature of the circulating hydrogen feeder 66, the temperature of the feedstock slurry feeder 68 and the pressure of the high-pressure vapor 71 generated in cooling heat exchanger 65.

Taking the processes involved in the equipment depicted in FIG. 2(b) for example, the feedstock feeder 80 (fuel-oil slurry feedstock) is divided into multi-flows to be introduced into the reactor at the upper part of the three-phase suspended bed. The slurry after reaction (the effluent from the outlet of hydrogenation product) 77/81 is led out from the bottom part of the reactor. The above configuration ensures enough residence time of the feedstock slurry in the reactor for the partial hydrogenating liquefaction. The circulating hydrogen is bubbled through the three-phase suspended bed 75, leaves the slurry bed layer from the upper part and enters into the gas-phase space provided at the upper part of the reactor, wherein the gas is cooled by the cooling heat exchanger 76, consequently, most of the heavy products are condensed and return to the three-phase suspended bed of the reactor and the effluent from the outlet of circulating hydrogen 79 is released from the top of the reactor. The heat medium in heat exchanger tube of the cooling heat exchanger 76 is high pressure hot water 82, which turns into high pressure vapor 83 with a pressure of about 50 atm after heat exchanging. This high pressure vapor can be used circularly as the power steam. The partial hydrogenating liquefaction of this invention turns out to be a low exothermic reaction, therefore, the internal temperature of the reactor can be effectively controlled by regulating the temperature of the circulating hydrogen feeder 78, the temperature of the feedstock slurry feeder 80 and the pressure of the high-pressure vapor 83 generated in cooling heat exchanger 76.

In terms of design, the amount of the circulating hydrogen should meet two requirements: firstly, the volume ratio of hydrogen to fuel-oil slurry feedstock is more than 600 during the operation of the reactor; secondly, the superficial velocity of the gas (under reactive condition) within the three-phase suspended bed reactor is between 0.15 m/s and 0.4 m/s, preferably between 0.2 m/s and 0.3 m/s. The design of the main body of the reactor should also ensure that the residence time of fuel-oil slurry feedstock in the three-phase suspended bed should be more than 20 minutes, generally about 20 minutes to 1.5 hours.

For instance, the slurry processing capacity of one three-phase suspended bed reactor with internal diameter of 6 meters and height of 42 meters can reach 1500 tons/hour, equivalent to 750 tons/hour for raw coal, which means that the raw coal processing capacity of one three-phase suspended bed reactor with internal diameter of 6 meters can arrive at 6 million tons/year. If this internal diameter is enlarged to 8 meters, the raw coal processing capacity will increase to 10 million tons/year, which totally satisfy the demand for the large scale partial hydrogenation process of multistage liquefying.

DESCRIPTION OF THE PREFERRED EMBODIMENTS

The multistage liquefaction of this invention will be further explained in details accompanying with the following examples; nevertheless, the following description does not limit the protection scope of this invention in any ways.

Example 1

Multistage Liquefying Process Using SHENFU-DONGSHENG Refined Coal 1# As Feedstock This example is based on the SHENFU-DONGSHENG refined coal 1# to carry out the multistage liquefaction, the specified processes and equipments are depicted in FIG. 1 and FIG. 2(a), wherein the technical process is:

1) The SHENFU-DONGSHENG refined coal 1#, as feedstock of carbonaceous solid fuel, is mixed with heavy oil to make fuel-oil slurry, the solid content of the fuel-oil slurry is 50 wt %; In the three-phase suspended bed reactor depicted in FIG. 2(a), this fuel-oil slurry is liquefied by hydrogenation under a low-medium pressure, wherein the operation condition of hydrogenation is a pressure of 25 atm and a temperature of 400° C.; then, the obtained light oil and heavy oil-residue slurry are separated; wherein the heavy oil used for preparing fuel-oil slurry is those separated from heavy oil-residue slurry; the hydrogenation catalyst is the spent catalyst from F-T synthesis process; the above-mentioned light oil is subsequently hydrorefined to yield refined oil;

2) The heavy oil-residue slurry from step 1) with a temperature of 200° C. is introduced into gasifier to generate syngas under a condition of a pressure of 50 atm and a temperature of 1350° C., and some superheated high-pressure steam accounting for 5 wt % to 10 wt % of the residue slurry is added to reduce the carbon black generation;

3) A portion of the resultant syngas is used to yield hydrogen; and

4) Most of the resultant syngas is converted into high-quality oil products mainly containing straight chain hydrocarbons by employing the high temperature F-T synthesis technology of Synfuels China and the F-T synthesis process and equipments of three-phase suspended bed reactor (Chinese patent application number: 200710161575.1 or international patent application number: PCT/CN2007/002941). After being hydrorefined and hydrocracked, the above-mentioned high quality oil products are combined with the refined oil of the light oil obtained from step 1), then fractionated to yield different high quality oil products, such as LPG, gasoline, aviation kerosene, diesel oil and so on.

The Results of the Example 1

The heating value of SHENFU-DONGSHENG refined coal 1# is 6000 kcal/kg and the heating value of dry coal is 6700 kcal/kg. The following table gives the data of main materials balance of the whole plant in the experiment using above-mentioned multistage liquefaction process with 1500 tons/hour of dry coal, wherein the feedstock coal contains 29 wt % of volatile content and less than 8 wt % of ash. All of the heavy oil-residue slurry derived from the hydrogenation process of the fuel-oil slurry (in the present example, it refers to the coal-oil slurry prepared from coal and heavy oil) are used for producing syngas by gasification; at the same time, the rest of the organic hydrocarbon fuel gas generated in hydrogenation and F-T synthesis process, is also totally converted to syngas after a balance between fuel and gas is reached. Main process parameters, feedstock consumption and output of main products are given in the following table.

| | | | |
|---|---|---|---|
| Dry coal for hydrogenation (t/hr) | 1500 | Water consumption of the whole plant (t/hr) | 3500 |
| Circulating oil (t/hr) | 1833 | Oxygen generation of the whole plant (Nm³/hr) | 692967 |
| H₂ for fuel-oil slurry hydrogenation (Nm³/hr) | 645000 | Power raw coal of the whole plant (t/hr) | 110 |
| Temperature of fuel-oil slurry hydrogenation (° C.) | 380-410 | Syngas generation (Nm³/hr) | 2301854 |
| Pressure of fuel-oil slurry Hydrogenation (bar) | 10-50 | F-T synthesis oil (t/hr) | 310 |
| Gaseous hydrocarbon yield in hydrogenation (t/hr) | 150 | Oil products of the whole plant | |
| Light oil yield in hydrogenation (t/hr) | 300 | LPG (t/hr) | 25.46 |
| Water yield in hydrogenation (t/hr) | 194 | Gasoline (t/hr) | 73.6 |
| Oil-residue slurry (t/hr) | 913 | Aviation kerosene (t/hr) | 76.38 |
| Heating value of oil-residue slurry (kcal/kg) | 7500 | Diesel oil (t/hr) | 441.88 |
| Thermal efficiency of the whole plant (%) | 57-60 | Total (t/hr) | 611 |

Example 2

Multistage Liquefying Process Using Hulunbeier Lignite as Feedstock

This example is based on the Hulunbeier lignite, and all the processes and equipments are the same as those in example 1.

The following table gives the data of main materials balance of the whole plant in the experiment using multistage liquefaction process with 1500 tons/hour of Hulunbeier lignite with a heating value of 4000 kcal/kg, 35 wt % of moisture, 40 wt % of volatile components and less than 10 wt % of ash. All of the heavy oil-residue slurry derived from the hydrogenation process of the fuel-oil slurry (in the present example, it refers to the coal-oil slurry prepared from coal and heavy oil) are used for producing syngas by gasification; at the same time, the rest of the organic hydrocarbon fuel gas generated in hydrogenation and F-T synthesis process, is also totally converted to syngas after a balance between fuel and gas is reached. Main process parameters, feedstock consumption and output of main products are given in the following table.

| | | | |
|---|---|---|---|
| Raw coal for hydrogenation (t/hr) | 1500 | Water consumption of the whole plant (t/hr) | 2500 |
| Circulating oil (t/hr) | 1466 | Oxygen generation of the whole plant (Nm³/hr) | 324852 |
| $H_2$ for fuel-oil slurry hydrogenation (Nm³/hr) | 422506 | Power coal of the whole plant (t/hr) | 140 |
| Temperature of fuel-oil slurry hydrogenation (° C.) | 380-410 | Syngas generation (Nm³/hr) | 1141904 |
| Pressure of fuel-oil slurry Hydrogenation (bar) | 10-50 | F-T synthesis oil (t/hr) | 123.6 |
| Gaseous hydrocarbon yield in hydrogenation (t/hr) | 180 | Oil products of the whole plant | |
| Light oil yield in hydrogenation (t/hr) | 180 | LPG (t/hr) | 12.67 |
| Water yield in hydrogenation (t/hr) | 225 | Gasoline (t/hr) | 33.48 |
| Oil-residue slurry (t/hr) | 448 | Aviation kerosene (t/hr) | 38 |
| Heating value of oil-residue slurry (kcal/kg) | 7800 | Diesel oil (t/hr) | 219.86 |
| Thermal efficiency of the whole plant (%) | 55 | Total (t/hr) | 304 |

As can be seen from the results of Example 1 and Example 2, the multistage liquefaction process of this invention partially liquefies the feedstock coal by hydrogenation at the first step, wherein some light oil is generated, and simultaneously, the heating value of gasified feedstock is increased as well. It thus greatly improves the efficiency of syngas production, and also the yield of oil products. The above results indicate that if the high quality coal (as showed in Example 1) is applied in this invention, the thermal efficiency of the whole plant reaches 57% to 60%; if the feedstock belongs to low-rank coal such as lignite (as shown in Example 2), the thermal efficiency of the whole plant reaches 55%. Comparing to the existing CTL technology, whose thermal efficiency of the whole plant is 38% to 48%, the thermal efficiency of the whole plant in this invention has been substantially improved by 10 to 20 percentage points. Hence, the method of the present invention provides a superior technical solution for efficiently and cleanly utilizing carbonaceous solid fuel resources.

The embodiments of the present invention are described in detail hereinbefore. It is obvious for those skilled in the art that a lot of modifications and changes can be done without departing from the basic spirit of this invention. All of these modifications and changes are within the protective scope of this invention.

What is claimed is:

1. A multistage liquefying method of carbonaceous solid fuel, wherein said method comprising the following steps:
   1) one or several kinds of carbonaceous solid fuels powder is mixed with heavy oil to make fuel-oil slurry, the fuel-oil slurry is subsequently dehydrated by heating at 150° C. to 200° C., and then partially liquefied by hydrogenation under a pressure of between 10 atm to less than 50 atm and a temperature of 350° C. to 450° C., then light oil components and a heavy oil-residue slurry are separated;
   2) the light oil components from the step 1) are hydrorefined to yield refined oil;
   3) the heavy oil-residue slurry from the step 1) is introduced into an oil-residue-slurry pressurized gasifier at a temperature of 100° C. to 400° C. to perform the gasification reaction with oxygen at a temperature of 1000° C. to 1800° C. to yield syngas, wherein the heating value of said heavy oil-residue slurry is in a range of 6000 kcal/kg to 9000 kcal/kg;
   4) the syngas from the step 3) is treated by conventional process and then converted to F-T synthesis oil using conventional F-T synthesis process; and
   5) the F-T synthesis oil from the step 4) is then hydrorefined and hydrocracked to produce refined oil, which is combined with the refined oil from the step 2), and then fractionated to yield high quality oil products including LPG, gasoline, aviation kerosene, diesel oil or other chemical products.

2. The method according to claim 1, wherein said carbonaceous solid fuels include a variety of high quality coals and low-rank coals, and different kinds of carbonaceous biomass.

3. The method according to claim 2, wherein said low-rank coal preferably is lignite.

4. The method according to claim 1, wherein said heavy oil for making said fuel-oil slurry in the step 1) is the heavy oil separated from said heavy oil-residue slurry, a product of said hydrogenation of the step 1); said heavy oil is directly used as a feedstock for preparing fuel-oil slurry, or partially or completely hydrogenated before preparing said fuel-oil slurry.

5. The method according to claim 1, wherein the solid content of said fuel-oil slurry of the step 1) is from 10 wt % to 70 wt %, based on the total weight of said fuel-oil slurry.

6. The method according to claim 1, wherein a residence time of said liquefaction by hydrogenation of said fuel-oil slurry in the step 1) ranges from 20 minutes to 1.5 hours; a yield of light oil components of said method accounts for 5 wt % to 40 wt %, based on the total weight of said solid fuel.

7. The method according to claim 1, wherein a spent catalyst of said F-T synthesis process is used for liquefaction by hydrogenation of said fuel-oil slurry in the step 1).

8. The method according to claim 1, wherein the slurry of said heavy oil-residue slurry from the step 1) is spray-cooled into solid powder, then made into coal water slurry for producing syngas by gasification or as boiler fuel for producing power steam.

9. The method according to claim 1, wherein said oil products obtained by the method contains less than 6 ppm of sulphur and less than 10 ppm of nitrogen; preferably, a octane number of said gasoline obtained by the method is between 90 and 98; a specific gravity of said aviation kerosene ranges from 0.74 to 0.83, and a cold filter plugging point ranges from −66° C. to −49° C.; or a cetane number of said diesel oil is from 55 to 70, and the cold filter plugging point is from −45° C. to 0° C.

10. The method according to claim 1, wherein the solid content of said fuel-oil slurry of the step 1) is from 20 wt % to 65 wt %, based on the total weight of said fuel-oil slurry.

11. The method according to claim 1, wherein the solid content of said fuel-oil slurry of the step 1) is from 40 wt % to 65 wt %, based on the total weight of said fuel-oil slurry.

12. The method according to claim 1, wherein a residence time of said liquefaction by hydrogenation of said fuel-oil slurry in the step 1) ranges from 20 minutes to 1 hour; a yield of light oil components of said method accounts for 5 wt % to 25 wt %, based on the total weight of said solid fuel.

* * * * *